United States Patent [19]

Merkle

[11] 4,365,825
[45] Dec. 28, 1982

[54] VEHICLE, ESPECIALLY A CAB-OVER-ENGINE COMMERCIAL VEHICLE

[75] Inventor: Josef Merkle, Esslingen, Fed. Rep. of Germany

[73] Assignee: Daimler-Benz Aktiengesellschaft, Stuttgart, Fed. Rep. of Germany

[21] Appl. No.: 18,332

[22] Filed: Mar. 7, 1979

[30] Foreign Application Priority Data

Mar. 7, 1978 [DE] Fed. Rep. of Germany ....... 2809664

[51] Int. Cl.$^3$ .................. B62D 1/18; B60R 21/02
[52] U.S. Cl. ............................ 280/777; 74/492; 180/274; 296/65 A
[58] Field of Search ................ 180/274, 78, 271; 280/777, 775, 779, 780; 74/493, 492; 296/65 A

[56] References Cited

U.S. PATENT DOCUMENTS

| | | | |
|---|---|---|---|
| 3,521,724 | 7/1970 | Mayer | 180/274 X |
| 3,531,154 | 9/1970 | La Fleche | 296/65 A |
| 3,556,550 | 1/1971 | Franchini | 280/777 |
| 3,691,866 | 9/1972 | Berkes | 180/78 X |
| 3,718,053 | 2/1973 | Cinadr | 280/775 X |
| 3,945,662 | 3/1976 | Murase et al. | 280/777 |
| 3,988,027 | 10/1976 | Serizawa et al. | 280/777 |

FOREIGN PATENT DOCUMENTS

608691 5/1978 U.S.S.R. .............. 180/274

Primary Examiner—Joseph F. Peters, Jr.
Assistant Examiner—Milton L. Smith
Attorney, Agent, or Firm—Paul M. Craig, Jr.

[57] ABSTRACT

A vehicle, especially a cab-over engine commercial vehicle, with a steering wheel which is disposed generally horizontally in a normal operating position and a steering column which is generally vertical and displaceably supported in the direction of the vehicle from in the vicinity of the steering wheel. A steering assembly formed by the steering wheel and steering column is displaceable to a protective position in which position the steering wheel assumes a fixed position when the steering column is displaced in the direction of the front of the vehicle. The steering column and steering wheel are automatically and positively displaced into their protective positions as a function of the deceleration of the vehicle and/or deformation of the vehicle front.

39 Claims, 6 Drawing Figures

VEHICLE, ESPECIALLY A CAB-OVER-ENGINE COMMERCIAL VEHICLE

The invention relates to a vehicle, especially a cabover-engine commercial vehicle, with a steering wheel located in the operating position and an upright steering column, supported displaceably with respect to the vehicle front in the vicinity of the steering wheel, wherein the steering assembly formed by the steering wheel and steering column is displaceable into a protective position so that the steering wheel assumes a vertical position when the steering column is displaced adjacent the vehicle front.

In a known design which has been implemented, the steering column is reinforced in the vicinity of the steering wheel by a deformable element adjacent the vehicle dash, and the steering wheel, which is horizontal in its operating position, is so connected to the vertical steering column that the steering wheel is swiveled against the vehicle front when the driver's chest strikes the wheel as he is thrown forward by deceleration. At the same time, the driver's weight also strikes the steering column, so that the entire steering assembly is displaced from its operating position to a protective position, in which a larger space is provided between the seat and steering assembly, and in which the steering assembly, especially the steering wheel, constitutes a form of protective panel for the driver.

An especial disadvantage of such a known design is that the steering assembly is displaced by the weight of the driver, and begins with a steering wheel in the operating position, so that the danger of injury to the driver in this initial position is relatively great. In particular, in a solution of this kind, the space produced by the deformation of the steering assembly cannot be used from the outset for passive driver protection, in other words, the maximum possible travel cannot be utilized for energy absorption using the conventional belt restraint system. In addition, a known design of this kind can only be used for relatively light commercial vehicles, and not for heavy trucks, since much more stably dimensioned steering systems are used in such vehicles for reasons of active driving safety and steerability even without power steering. However, it is precisely for such heavy commercial vehicles that these problems become especially important, since an optimum compromise between the maximum driving comfort and the greatest possible safety in the event of accidents is most important and requires the largest possible space in the cab. However, modern development trends which place particular emphasis on improving aerodynamics have caused a further constriction of the available space in the cab. Further limitations of this kind also result from the fact that the modern safety systems, especially the passive restraint systems, can only operate effectively if the driver is always restrained as firmly as possible, which in turn means that at least the most important operating controls must be within easy reach, in order not to have a disadvantageous effect upon the driver and consequently upon the active safety of the vehicle as a result of the safety systems.

According to the invention, the criteria outlined above, which are contradictory in terms of the trends taken by efforts to solve them, can be advantageously satisfied by virtue of the fact that the steering column and steering wheel are automatically moveable in a positive manner to their protective positions as a function of deceleration of the vehicle and/or deformation of the vehicle front. This design results in an enlarged space, produced without the driver coming in contact with the steering system, which permits the restraint system to be utilized to protect the driver, and by the fact that the driver comes in contact with the steering system, coming closer to it than is required for pure operating purposes, only when the system, i.e. the steering wheel and steering column, have already been moved to a position which protects the driver, so that in the final analysis the steering system can constitute a safety device which only becomes operational after the conventional belt restraint system has been optimally utilized. The steering system, especially the steering wheel which forms a sort of impact absorber, can support the driver against the windshield, in the solution according to the invention, whereby it is especially advantageous that in this design additional protective properties can be given to the steering system to allow it to swivel beyond the protective position. This is accomplished within the framework of the invention by virtue of the fact that the steering system can be swiveled beyond the actual protective position, which constitutes a middle position, only against an increasing counter-force. In particular, the system according to the invention allows the steering system, comprising the steering wheel and steering column, to swivel automatically, despite the fact that the steering wheel is in the operating position, or to provide for example an air bag system in its hub area, whereby such an air bag system can incorporate an "impact pot*," which can be disposed with or without the air bag system in the connection between the steering wheel and the steering column.

*German "Pralltopf."

With respect to the large space which is created, particularly in connection with belt restraint systems, it becomes especially important to solve the problem of preventing the driver from sliding down between the seat and the steering assembly.

This problem can be solved according to the invention in a simple fashion by virtue of the fact that the entire driver's seat, and also possibly a seat extension element associated with the driver's seat, is displaced in the direction of the vehicle front, when the steering assembly is displaced from its operating position to its protective position.

Preferably, a common unlocking system can be provided for the steering assembly and the seat, said system releasing the lock on the steering system and the seat as a function of the deceleration of the vehicle or deformation of the vehicle front, so that the seat and steering assembly can be displaced accordingly. The displacement of the seat, within the framework of the invention, can be associated preferably with that stage of the displacement of the steering assembly in which the steering assembly is displaced beyond its middle protective position toward the vehicle front.

A steering drive is considered advantageous in the framework of the invention to hold the steering assembly, said drive, with simple design, permitting automatic shifting from the locked position corresponding to the operating position to the protective position which constitutes a middle position. A steering assembly drive of this kind can advantageously comprise a pair of rods, which, acting as a trapezoidal or parallelogram rod pair, can be articulated at one end firmly to the vehicle and at the other end to a connecting rod which supports the steering wheel. Preferably, the upper rod of the drive is articulated in the vicinity of the dash, and, in its position corresponding to the operating position, extends at a relatively shallow slope diagonally forward and downward. The lower rod of the rod pair, in which the steering spindle can also preferably be incorporated or possibly can even constitute the steering spindle itself, preferably extends in the operating position at a shallow slope forward and nearly vertically downward, so that a long displacement path is provided for the steering assembly. In particular, according to the invention, the lower rod can be articulated approximately in the floor area of the vehicle cab, and the length ratios for the upper and lower rods can be made advantageously such that the lower rod is at least twice as long as the upper rod.

The driver restraint is made as tight as possible for safety reasons, and therefore it has been found to be advantageous for the connecting rod of the steering drive, to which the steering wheel is connected, to support simultaneously at least a portion of the instruments. In particular, those instruments are involved which are necessary for direct vehicle operation, while the other instruments can be mounted on the fixed dash.

With respect to the automatic displacement of the steering assembly according to the invention from its operating position to the protective position after the lock is released, a corresponding positioning spring can be associated with one of the rods, especially the shorter of the rods. This spring can be formed by a torsion rod or a rubber spring element. The support spring is preferably arranged such that the protective position of the steering assembly corresponds to a middle position into which the steering assembly is swiveled by the spring after the lock is released. If the steering assembly, under the influence of the driver's weight, is swiveled further in the direction of the vehicle front, the spring develops a counter-force, whereby the spring is preferably given a progressive characteristic for this area, the characteristic being adjusted so as to impose the maximum permissible deceleration upon the driver.

The switching of the steering assembly provided according to the invention, from its operating position to its resting position, can also be utilized in another embodiment to enlarge the space in the cab for example for sleeping, getting in and out, or for other purposes. According to the invention, the lock can then be released deliberately, either manually or otherwise, this deliberate release being preferably locked out during operation. The resetting process then required for normal operation can be accomplished either manually or mechanically, servo systems forming part of the vehicle being used to overcome the necessary forces.

The fact that the upper rod is articulated in the vicinity of the dash, and the lower rod is articulated in the vicinity of the floor according to the invention means that the articulation points on the chassis are located in relatively rigid areas, so that the system according to the invention remains largely intact even in the event of accidents. In particular, with the type of articulation and pretensioning according to the invention, deformation of the cab in normal cases does not result in a situation in which the steering assembly, especially the steering wheel, moves to a position which is hazardous for the driver, and for example, causes the driver to strike a sharp edge. Instead, the function of the impact panel is maintained by the steering wheel in practically all situations, and survival space, required in particular for surviving serious accidents, is not inadmissibly restricted inside the cab.

As mentioned at the outset, the system according to the invention responds as a function of deformation or deceleration. Consequently, according to the invention, response depends on the lock first being released. To release the lock, at least one detecting element, designed as a sensing mass and/or a detector, can be provided, whereby the sensing mass can be formed by an additional mass or by a mass which is part of the vehicle itself, thus for example the mass of the cab moveably articulated to the frame. Additional masses on the other hand are required in cases in which the cab is firmly attached to the vehicle frame.

According to the invention, an element which is displaceable as a function of the deformation of the front of the vehicle can be used as a sensing element. In addition, however, the cab itself can serve as a sensing element, if the cab is moveably mounted on the frame. In this manner, it is possible in a simple fashion to combine the sensing element and the sensing mass in a single element, thereby resulting in a simple design for the locking device.

Further details and features of the invention will be apparent from the claims and the following description of embodiments shown in schematic form wherein like elements are designated using identical reference numerals.

FIG. 5 is another drawing corresponding to previous FIGS. 1 and 3 and 4, whereby the cell has been pushed even further beyond its intermediate position shown in FIG. 4 into the recess on the frame, and has also been deformed additionally by the obstacle, while

In the embodiments shown in the figures, the forward part of a commercial vehicle is shown, especially a heavy truck, wherein the cab design 1 constitutes a cabin 12, which is designed as a rigid cell, and is embedded in turn in a recess on the frame. The cabin itself is arranged to accept only the operating controls and the crew, and the recess marked 3 constitutes a frame on the sides and rear such that this frame in turn can be supported elastically with respect to the chassis within the framework of the invention, in order, as a result of the sliding of flexible supports behind one another, to achieve on the one hand especially good damping characteristics for the chassis recess 3 with respect to vehicle frame 4 and on the other hand for cabin 2 with respect to chassis recess 3. Chassis recess 3 in the vehicle chassis is associated in particular with the auxiliary assemblies, whereby the latter can be provided within the framework of the invention to a significant degree with a rearward service and exhaust shaft, designated here by 5, and which preferably runs upward above the cabin and, on the basis of the overall design, constitutes a transition element between the cabin and the body 6 located behind it. On the floor, the chassis recess 3 constitutes a shield for the motor, whereby improved damping conditions with respect to cabin 2 can be achieved and the mudguards and the like can be included in chassis recess 3 at those points in which they are in contact with the floor 7. The question of whether mudguards, shock absorbers or the like, or even the recess itself, are located here, or are mounted directly on the vehicle frame, is a question of design, in which connection appropriate adjustments for the weight of the cabin must be taken into account, so that high-frequency vibrations can be filtered out through the chassis recess, similar to the subframe design in automobiles.

The flexible arrangement of cabin 2 relative to chassis recess 3 on the chassis, in the embodiment shown, allows cabin 2 to move to a certain degree relative to chassis recess 3 in the event of a collision, and to make it displaceable without danger of injury. Excessive, especially frontal loads, like those indicated in FIGS. 4 and 5, produce conditions in which the cabin is pushed backward into chassis recess 3. This is made possible in the solution according to the invention by virtue of the fact that chassis recess 3 is designed as a deforming element especially as regards its service and exhaust shaft 5 and the elements contained therein. Hence, this service and exhaust shaft 5 can constitute an energy-absorbing support, whereby the service and exhaust shaft conversely can provide a simultaneous protection against the load, so that portions of the loads striking the back of cabin 2 cannot penetrate the cabin. Within the framework of the protective function assigned according to the invention to the service and exhaust shaft, it is important for the parts associated with the shaft to have designs suitable for this function, and it is advantageous to make the service and exhaust elements, to the extent that they are located in the supply shaft, as deformable elements.

Figure 4:
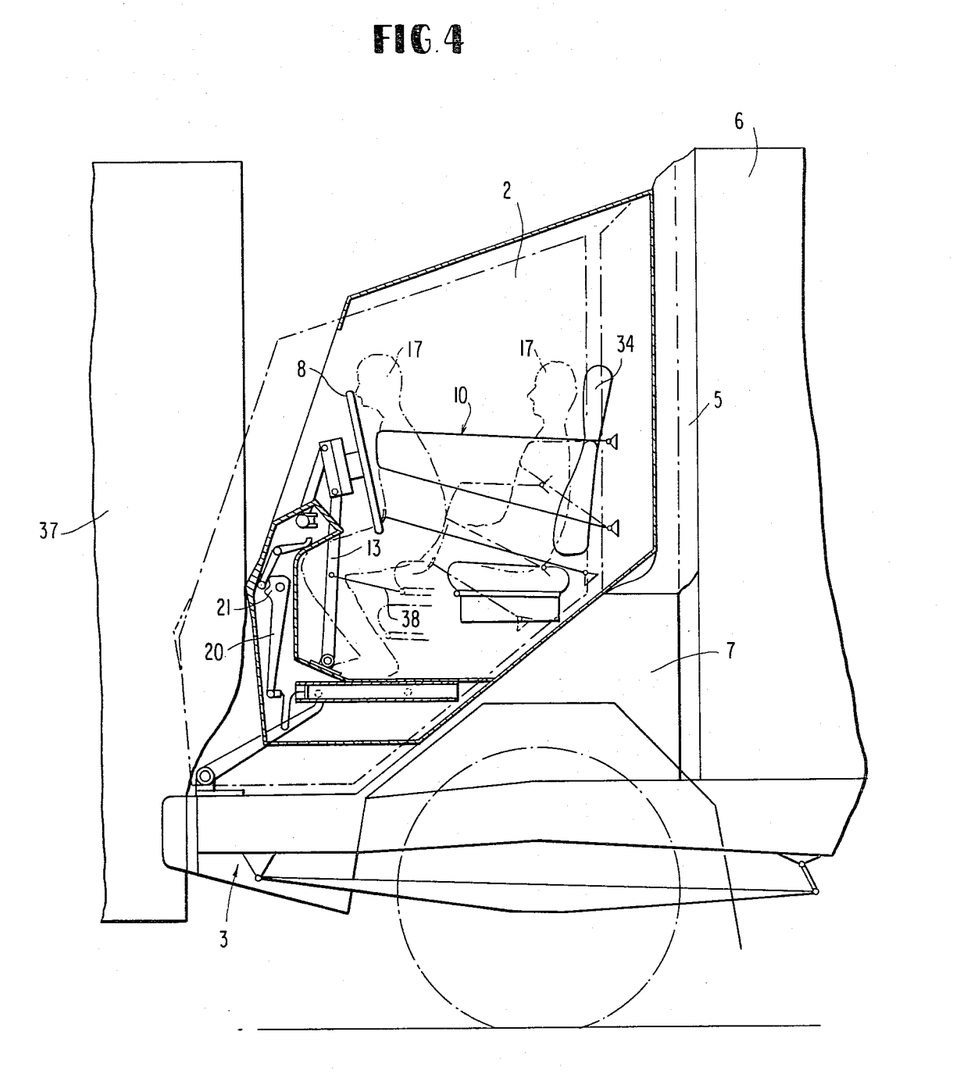
FIG. 4 is a further intermediate position in a drawing corresponding to the drawings in FIGS. 1 and 3, whereby the cab as such, which is in the form of a non-deformable cell, has not yet been deformed, but has been pushed into the recess on the frame from its initial position.
Figure 5:
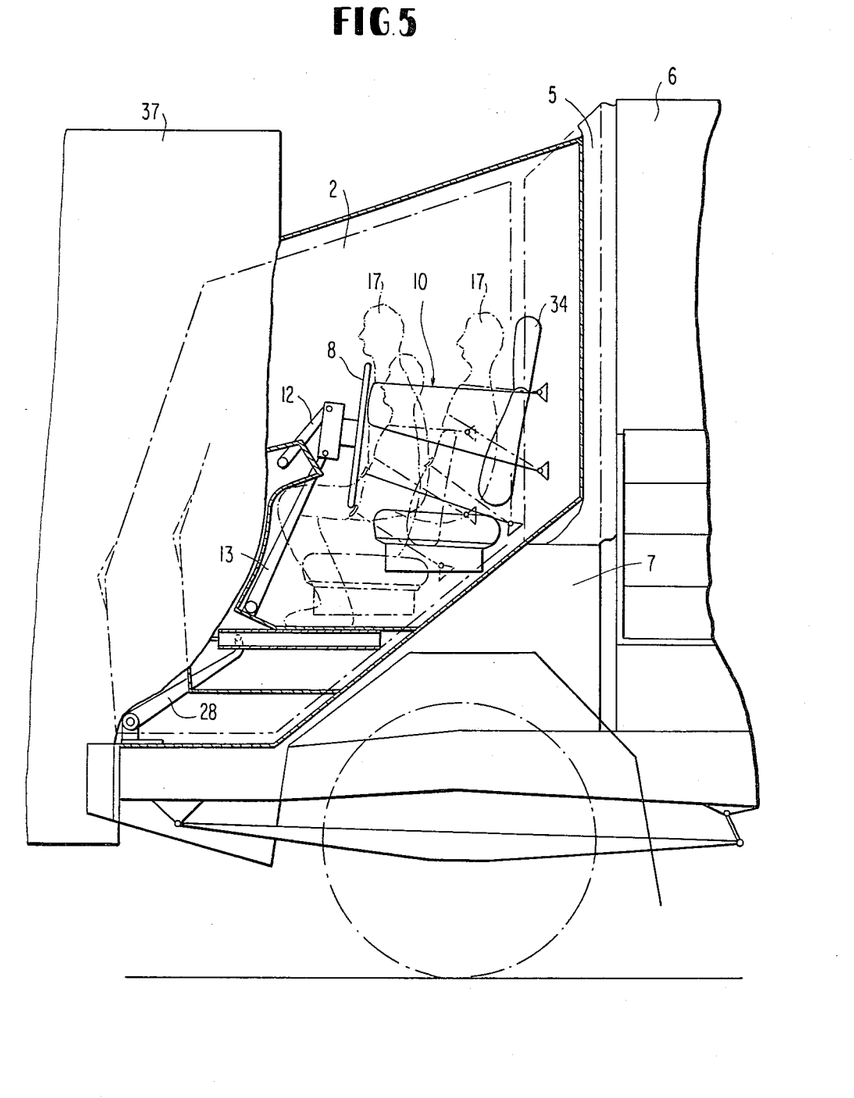

Furthermore, in the embodiment according to the invention which is illustrated, as can be seen in the drawings, chassis recess 3 is designed in its rearward, floor-related area as a steep, upwardly inclined plane, whereby the recess corresponds to a matching design of the cabin. This design according to the invention results in a situation in which the cabin, as shown in FIGS. 4 and 5 not only can move lengthwise along the length of the vehicle, but can also be displaced upward, so that auxiliary assemblies, engine block, and wheels cannot block the backward movement of cabin 2.

In the usual fashion, cabin 2 comprises at least one driver's position and this driver's position is so arranged in terms of the locations of steering wheel, steering column, seat, and dashboard, that in the event of collisions, the largest possible free area is provided for the movement of the driver in order to improve his chances of survival.

In accordance with this design, in the embodiment shown according to the invention, the steering wheel and steering column are so articulated with respect to the cabin that when vehicle decelerations and/or deformations of the vehicle front occur in excess of a critical threshhold, they are forcibly and automatically displaceable into a protective position. In this connection, in the solution shown, steering wheel 8 and steering column 9 are displaceable into a protective position from a rearward operating position shown in FIG. 1, in which the steering wheel is located essentially horizontally and the steering column is essentially vertical, in which protective position the steering column 9 is swiveled slightly forward, and in which protective position the steering wheel 8 assumes a more vertical position. In this position of steering wheel 8, which can be seen in FIG. 3, the steering wheel 8 constitutes an impact panel, which is so adjusted in the usual manner in the case of a driver held in place in cabin 2 by belt system 10 in the event of a collision, that the driver can be supported with the upper part of his body flat against steering wheel 8 as he bends forward. The articulation of the steering wheel and steering column according to the invention is accomplished by means of a steering drive 11, comprising at least one rod pair having a forward upper rod 12 and a rear lower or arm rod 13. The forward, upper rod extends in the embodiment shown essentially slightly diagonally downward and forward in the direction of travel, while the rear lower arm has a position essentially parallel to the steering column in the initial position, and is slightly diagonally forward and downward when upright. The rear lower arm 13 is articulated to the cabin in the vicinity of the floor and the forward upper rod is preferably articulated to the dash 14 of the cabin, which constitutes an especially non-deformable part. Not shown, but indicated in FIG. 3 and lying within the scope of the invention, is the fact that steering column 9 can be integrated in one of the steering rods, especially the rear lower rod 13, producing a solution which is especially economical of space. Furthermore, this does away with a separate steering rod. Such a solution, in which one of the steering rods is replaced by the steering column, is only possible however when the cab constitutes a part which is fixed relative to the chassis and/or when the steering system, composed of the steering wheel 8 and steering column 9, is not displaceable relative to the steering drive.

Figure 1:
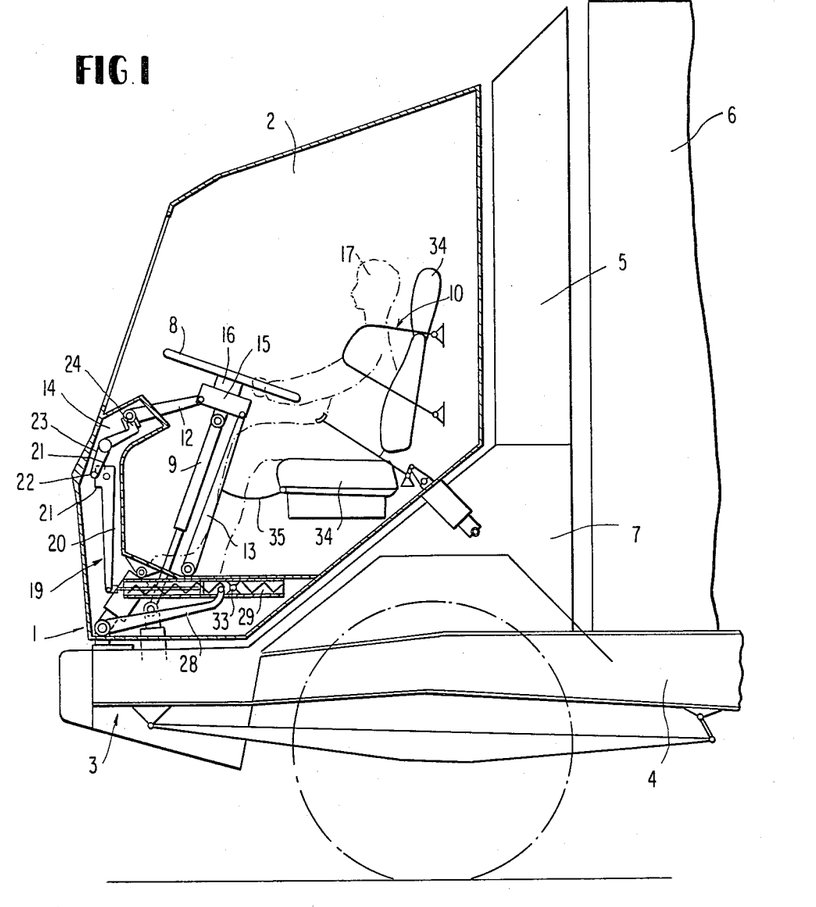
FIG. 1 shows a preferred embodiment according to the invention of a commercial vehicle with a non-deformable cab, moveably imbedded in a recess on the chassis.

At the steering wheel end, rods 12, 13 are articulated to a connecting rod 15, which supports steering wheel 8 by means of an "impact pot" or a similar deformable element, indicated in FIG. 1 by 16.

Figure 2:
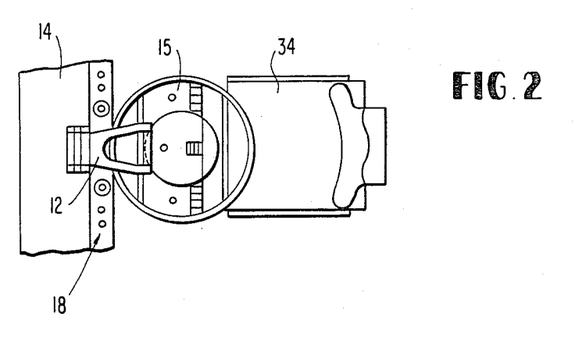
FIG. 2 is a schematic drawing of the driver's seat area of the cab in a top view, whereby the arrangement of the steering and the operating elements associated with the instruments are shown relative to the driver's seat.

In view of the fact that it is very important for the effective operation of belt systems 10 for the driver 17 to be restrained with the minimum amount of belt slack in the original position, the arrangement of the operating elements directly necessary for driving in the immediate reach of the driver 17 is particularly important. For this reason, according to the invention, connecting rod 15, as can be seen in particular from FIG. 2, is simultaneously designed as an instrument support, so that all of the important instruments are directly adjacent to the steering wheel and are within the immediate reach and vision of the driver. The other instruments, which are not always necessary for driving and likewise need not always be observed continuously, can be disposed on dash 14 within the scope of the invention as shown at 18. Moreover, it is also advantageous for dash 14, as can be seen from the figures, to be shaped in the form of a basin so that, as shown in particular in FIG. 4, protection for the legs is provided. An appropriate cushion is advantageous and valuable if provided here in the usual manner.

Figure 3:
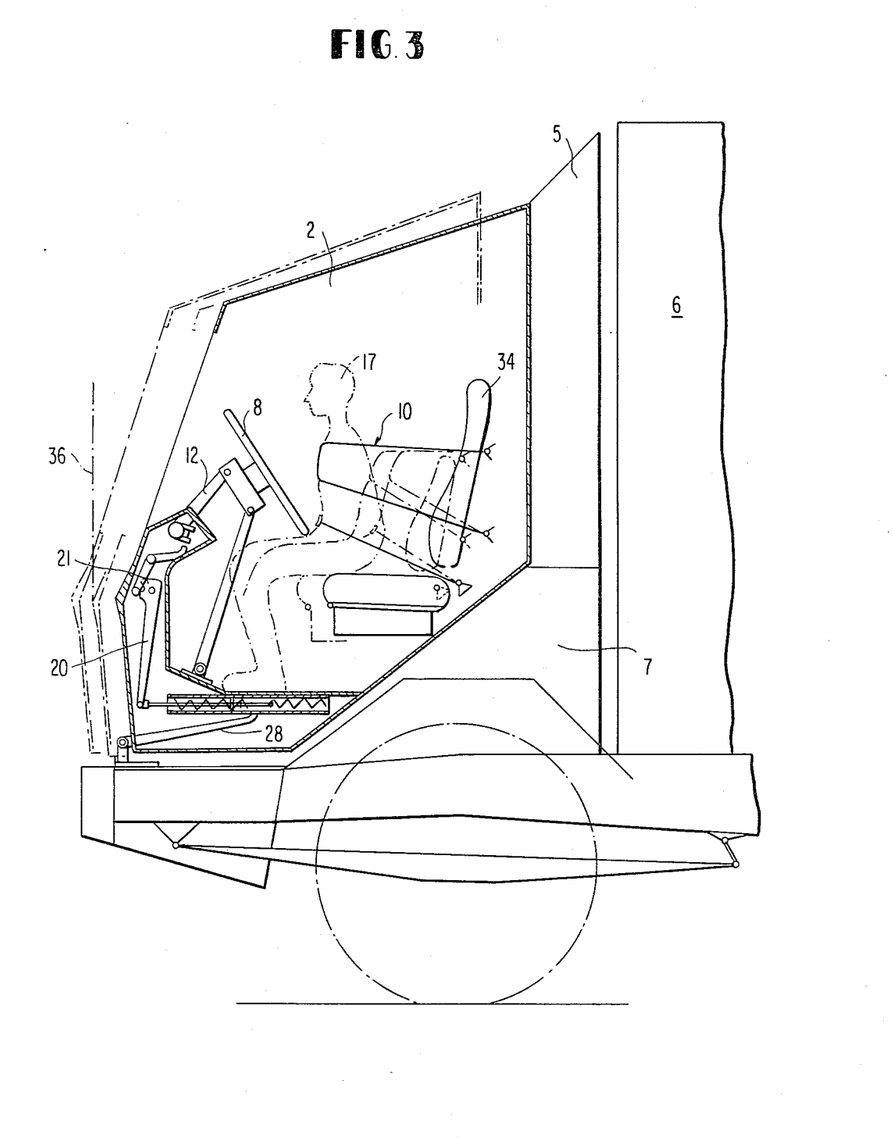
FIG. 3 is a drawing corresponding to FIG. 1, whereby, on the basis of the reference position shown in FIG. 1, which shows normal operation, intermediate positions are shown which are reached, moving forward, on the basis of an acceleration which exceeds the critical deceleration, and (rearward, as a result of contact with an obstacle, whereby the the steering assembly comprising the steering wheel and steering column has moved from its operating position on its protective position.
Figure 6:
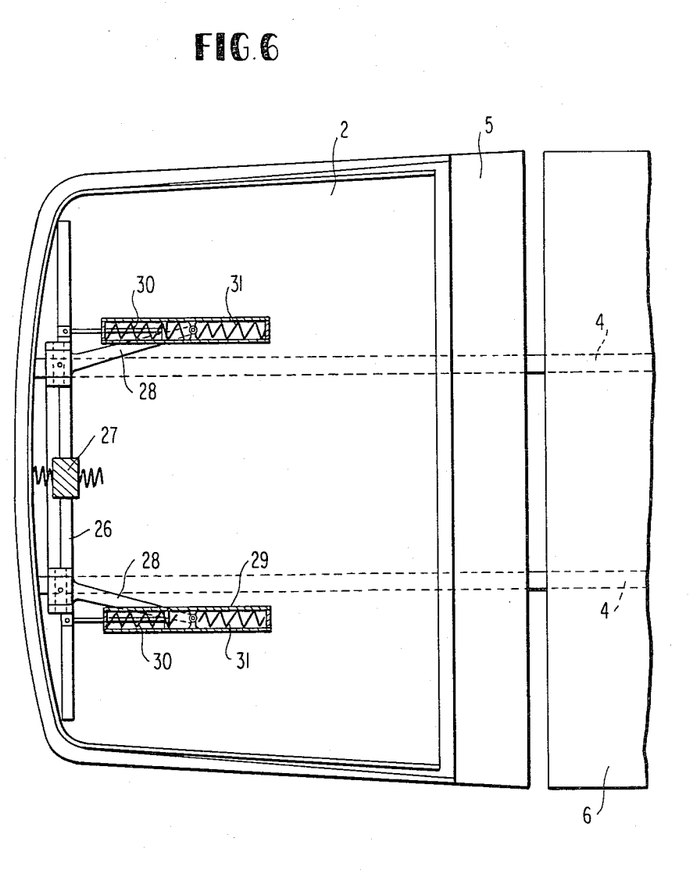
FIG. 6 is a schematic cross section which shows the locking and release mechanism in greater detail.

As already mentioned, the deflection of the steering assembly from its operating position shown in FIG. 1 to its protective position shown in FIG. 3 as a function of deceleration of the vehicle and/or deformation of the front of the vehicle takes place positively and automatically. Accordingly, a releasing device, which responds to deceleration or deformation, is required. According to the invention, this comprises a lock which is released when limiting values for deceleration or deformation are exceeded. The lock, represented as a whole by 19, according to the invention comprises a swivel lever 20, which has a locking position corresponding to its normal position FIG. 1 and comprises two cams 21, between which a counter-arm 22 of a locking lever 23 is engaged. Locking lever 23, likewise in the embodiment shown, is made in the form of a double lever, and with the lever rod which is opposite cam 22, engages upper rod 12 through a locking nose 24, said rod thus being held in the position which corresponds to its operating position as shown in FIG. 1. The end of the release mechanism which is opposite cam 21 acts upon swivel lever 20, which as is evident, is likewise made as a double lever and which in the embodiment is swivelable about an axis 25 which runs in the direction transverse to the length of the vehicle. This release mechanism, of the case of operation triggered by deceleration, can be formed by the sensing mass, and in the case of operation triggered by deformation, by a detector. A rod, preferably extending over at least a large part of the width of cabin 2, can be used as such a sensing element, as indicated by 26 and shown especially clearly in FIG. 6, so that when there is corresponding deformation of the cabin, swivel lever 20 is so swiveled by the rod that the lock on the steering assembly is released in its operating position. Parallel to this detecting of deformations, according to the invention, a deceleration detecting release mechanism is preferably provided according to the invention, whereby this device, as shown in FIG. 6, can be formed by a sensing mass 27, which, for example by providing an appropriate spring support, can be associated with sensor 26 and can even be constituted by the latter.

An especially advantageous design of the invention is achieved in which the cabin itself is used as a sensing mass and according to this invention, and with this design, a device is preferably provided through which the relative movement between cabin 2 and recess 3 and/or vehicle frame 4 can be detected. In particular, this detection, is accomplished with the aid of a supporting lever 28 articulated on frame 4, whereby as shown in FIG. 6, a symmetrical arrangement has been found to be advantageous, wherein supporting levers 28, mounted on both sides of the longitudinal central plane of the vehicle, are provided on both sides. Supporting levers 28 simultaneously constitute a portion of the longitudinal and transverse guidance of cabin 2, and, with their ends which are bent downward and located away from frame 4, fit into a guide sleeve 29, which is forced toward a central position by two springs 30, 31.

While in FIG. 4 the shape of cabin 2 has still been retained and only deformation of the service and waste shaft 5 has taken place, in more serious accidents as shown in FIG. 5, cabin 2 can also be deformed. Here the steering assembly, especially steering wheel 8, constitutes a protective shield for the driver. In the type of articulation according to the invention (steering drive 11), care is taken to ensure that when the usual type of deformation of cabin 2 takes place, the position of the steering wheel relative to drive 17 remains essentially constant, and thus no additional danger of injury to the driver is created, but rather protection is provided for him. In particular, with the steering wheel 8 in the position shown (FIG. 5), the steering wheel itself takes up only minimum space, so that the survival space for the driver remains at its maximum. As an obstacle 37 continues to penetrate the cabin, in the solution according to the invention, the driver, and with him, the seat 34 as well, is displaced by the steering wheel 8 toward the back of the cabin, without the driver necessarily suffering especially serious injuries. This is especially true if the steering wheel 8 has an air bag installed in it, preferably mounted in the vicinity of the hub, whereby this air bag is only triggered according to the invention when the protective position for the steering assembly is reached. Thus, according to the invention, with a conventional cab-over-engine design, an air bag system can be used to protect the driver, without an additional belt system. Instead of the displacement and locking devices which operate mechanically and are shown, it is possible within the scope of the invention to provide corresponding hydraulic, pneumatic, or electrical devices.

With respect to seat 34, it is provided according to the invention to automatically displace it according to the displacement of the steering assembly, forward, especially as a function of inertia, and preferably automatically. The displacement is then initiated as soon as the middle protective position has been reached by the steering assembly. Release and/or engagement can then be initiated or effected by means of a cable 35 (FIG. 1) or the like, whereby this cable serves as a coupling element to release a lock. A lock of this kind can be associated for example with conventional longitudinal adjustment systems for seats. The forward displacement of seat 34 is made irreversible, with respect to both the seat and the back rest, to prevent a rearward displacement as long as it is not required in conjunction with the deformation of the cabin (FIG. 5). Thus, in the solution according to the invention, the driver 17 is always kept above the seat 34.

I claim:

1. A vehicle having a steering assembly which includes a steering wheel and a steering column, the steering wheel being disposed substantially horizontally in a normal operating position and the steering column extending essentially vertically, characterized in that means are provided for automatically and positively displacing the steering wheel from the normal operating position into at least one passenger protective position as a function of at least one of a predetermined deceleration of the vehicle and a deformation of the front of the vehicle, said displacing means includes a locking means for locking the steering wheel in the normal operative position, means are provided for automatically releasing the locking means so as to enable the steering wheel to automatically shift to the protective position, a steering drive means is provided for mounting the steering assembly in the vehicle, the steering drive means includes a pair of rod means with one rod means forming an upper rod means and the other rod means forming a lower rod means, the upper rod means is articulated to a structural component of the vehicle substantially at a level of a dashboard means of the vehicle with the lower rod means being articulated in an area of one of a floor and frame of the vehicle.

2. A vehicle according to claim 1, characterized in that the lower rod means forms the steering column.

3. A vehicle according to claim 1, characterized in that means are provided for supporting the steering wheel and for connecting the upper and lower rod means to the steering wheel.

4. A vehicle according to claim 3, characterized in that said connecting and supporting means forms a support for at least some vehicle instrumentation.

5. A vehicle according to claim 4, characterized in that means are provided for normally urging one of the rod means into a position corresponding to the protective position.

6. A vehicle according to claim 5, characterized in that said urging means includes a spring means.

7. A vehicle according to claim 6, characterized in that the spring means acts upon the upper rod means.

8. A vehicle according to claim 5, characterized in that the protective position of the steering wheel reached as a result of the automatic and positive displacement thereof forms a middle position of the steering wheel, and in that the steering assembly can be further displaced through the middle position as a function of a stress applied thereon.

9. A vehicle according to claim 8, characterized in that the stress applied results from weight of a vehicle passenger acting upon the steering assembly and moving in a direction of the front of the vehicle.

10. A vehicle according to claim 8, characterized in that means are provided for bilaterally and elastically supporting the steering assembly in a direction of the protective position corresponding to the middle position.

11. A vehicle according to claim 10, with a seat means for accommodating a driver for the vehicle, characterized in that means are provided for mounting the seam means in the vehicle so as to be freely displaceable in a longitudinal direction of the vehicle at least over a portion of an adjusting displacement path of the seat means.

12. A vehicle according to claim 11, characterized in that means are provided for limiting the free longitudinal displacement of the seat means.

13. A vehicle according to claim 11, characterized in that means are provided for locking the seat means in an adjusted position, and in that means are operatively connected with the locking means of the seat means and the steering assembly for unlocking the locking means of the seat means as a function of at least one of the predetermined deceleration of the vehicle and deformation of the front of the vehicle so as to enable the free longitudinal displacement of the seat means.

14. A vehicle according to claim 13, characterized in that the means for unlocking the locking means of the seat means is rendered effective after the steering wheel passes through the middle position corresponding to the protective position so as to thereafter permit a displacement of the seat means.

15. A vehicle with a vehicle cab, a steering assembly which includes a steering wheel and a steering column, the steering wheel being disposed substantially horizontally in a normal operating position and the steering column extending essentially vertically, characterized in that means are provided for automatically and positively displacing the steering wheel from the normal operating position into at least one passenger protective position as a function of at least one of a predetermined deceleration of the vehicle and a deformation of the front of the vehicle, said displacing means includes only one locking means for locking the steering wheel in the normal operative position, means are provided for automatically releasing the locking means so as to enable the steering wheel to automatically shift to the protective position, detecting means are operatively connected with the automatic releasing means and are responsive to at least one of the predetermined deceleration of the vehicle, deformation of the front of the vehicle, and a displacement of the vehicle cab, and in that means are provided for normally biasing the locking means into a middle locking position.

16. A vehicle according to claim 15, characterized in that the biasing means includes a spring means.

17. A vehicle according to claim 15, characterized in that the detecting means includes at least one of a sensing mass and a sensor means.

18. A vehicle according to claim 17, characterized in that the sensing mass is in the form of an additional mass mounted on the vehicle.

19. A vehicle according to claim 17, characterized in that means are provided for mounting the vehicle cab for articulating movement with respect to a frame of the vehicle whereby the vehicle cab forms the sensing mass.

20. A vehicle according to claim 19, characterized in that the sensor means is constructed as a sensor element which is displaceable as a function of the deformation of the front of the vehicle.

21. A vehicle according to claim 20, characterized in that the sensor element extends at least substantially over a width of the vehicle.

22. A vehicle according to claim 17, characterized in that means are provided for mounting the vehicle cab for movement relative to a frame of the vehicle, and in that the vehicle cab forms a sensor element of the sensor means.

23. A vehicle according to claim 22, characterized in that means are provided for coupling the sensor element with the sensing mass.

24. A vehicle according to claim 17, characterized in that means are provided for mounting the vehicle cab for movement relative to a frame of the vehicle, and in that the vehicle cab forms the sensing mass and the sensing means.

25. A vehicle according to claim 24, characterized in that the locking means includes at least one pivotal element adapted to be displaced as a function of at least one of the deceleration of the vehicle, a deformation of a front of the vehicle, and a displacement of the vehicle cab in a direction of the pivotal element, and in that cam means are operatively associated with the pivotal element for locking the pivotal element in a normal position.

26. A vehicle according to claim 25, characterized in that the cam means includes a first cam provided on the pivotal element, a second cam provided on a further pivotal element interposed between the first pivotal element and the steering assembly, and a counter-cam interposed between the first and second cams.

27. A vehicle with a seat means for accommodating a driver for the vehicle, a steering assembly which includes a steering wheel and a steering column, the steering wheel being disposed substantially horizontally in a normal operating position and the steering column extending essentially vertically, characterized in that means are provided for automatically and positively displacing the steering wheel from the normal operating position into at least one passenger protective position as a function of at least one of a predetermined deceleration of the vehicle and a deformation of the front of the vehicle, means for mounting the steering assembly in the vehicle, means for supporting the steering assembly mounting means with the steering wheel, means are provided for mounting the seat means in the vehicle so as to be freely displaceable in a longitudinal direction of the vehicle at least over a portion of an adjusting displacement path of the seat means, means are provided for locking the seat means in an adjusted position, and in that means are operatively connected with the locking means of the seat means and the steering assembly for unlocking the locking means of the seat means as a function of at least one of the predetermined deceleration of the vehicle and deformation of the front of the vehicle.

28. A vehicle according to claim 27, characterized in that the means for unlocking the locking means of the seat means is rendered effective after the steering wheel passes through the protective position to thereafter permit a displacement of the seat means.

29. A vehicle having a steering assembly which includes a steering wheel and a steering column, the steering wheel being disposed substantially horizontally in a normal operating position and the steering column extending essentially vertically, characterized in that means are provided for automatically and positively displacing the steering wheel from the normal operating position into at least one passenger protective position as a function of at least one of a predetermined deceleration of the vehicle and a deformation of the front of the vehicle, said displacing means includes a locking means for locking the steering wheel in the normal operative position, means are provided for automatically releasing the locking means so as to enable the steering wheel to automatically shift to the protective position, the steering unit assumes an upright position with the steering column being offset in the direction toward the front of the vehicle, said locking means comprises a control gear mechanism exhibiting a locking position corresponding to the operating position of the steering unit, and in that the control gear mechanism means can be changed over automatically into a protective position from its operative position in dependence on one of vehicle deceleration and deformation of the vehicle front, by releasing the locking action on the control gear mechanism means, the latter changing to a position corresponding to the protective position of the steering unit.

30. A vehicle having a steering assembly which includes a steering wheel and a steering column, the steering wheel being disposed substantially horizontally in a normal operating position and the steering column extending essentially vertically, characterized in that means are provided for automatically and positively displacing the steering wheel from the normal operation position into at least one passenger protective position as a function of at least one of a predetermined deceleration of the vehicle and a deformation of the front of the vehicle, said displacing means includes a locking means for locking the steering wheel in the normal operative position, and in that means are provided for automatically releasing the locking means so as to enable the steering wheel to automatically shift to the protective position, with a vehicle cab, characterized in that only one locking means is provided, detecting means are operatively connected with the automatic releasing means which detecting means are responsive to at least one of the predetermined deceleration of the vehicle, deformation of the front of the vehicle, and a displacement of the vehicle cab, further characterized in that the detecting means includes at least one of a sensing mass and a sensor means.

31. A vehicle according to claim 30, characterized in that the sensing mass is in the form of an additional mass mounted on the vehicle.

32. A vehicle according to claim 30, characterized in that means are provided for mounting the vehicle cab for articulating movement with respect to a frame of the vehicle whereby the vehicle cab forms the sensing mass.

33. A vehicle according to claim 32, characterized in that the sensor means is constructed as a sensor element which is displaceable as a function of the deformation of the front of the vehicle.

34. A vehicle according to claim 33, characterized in that the sensor element extends at least substantially over a width of the vehicle.

35. A vehicle according to claim 30, characterized in that means are provided for mounting the vehicle cab for movement relative to a frame of the vehicle, and in that the vehicle cab forms a sensor element of the sensor means.

36. A vehicle according to claim 35, characterized in that means are provided for coupling the sensor element with the sensing mass.

37. A vehicle according to claim 30, characterized in that means are provided for mounting the vehicle cab for movement relative to a frame of the vehicle, and in that the vehicle cab forms the sensing mass and the sensing means.

38. A vehicle according to claim 37, characterized in that the locking means includes at least one pivotal element adapted to be displaced as a function of at least one of the deceleration of the vehicle, a deformation of a front of the vehicle, and a displacement of the vehicle cab in a direction of the pivotal element, and in that cam means are operatively associated with the pivotal element for locking the pivotal element in a normal position.

39. A vehicle according to claim 38, characterized in that the cam means includes a first cam provided on the pivotal element, a second cam provided on a further pivotal element interposed between the first pivotal element and the steering assembly, and a counter-cam interposed between the first and second cams.

* * * * *